United States Patent
Gopal et al.

(10) Patent No.: US 10,142,101 B2
(45) Date of Patent: Nov. 27, 2018

(54) HARDWARE ENFORCED ONE-WAY CRYPTOGRAPHY

(71) Applicant: Intel Corporation, Santa Clara, CA (US)

(72) Inventors: Vinodh Gopal, Westborough, MA (US); Jason W Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 14/868,579

(22) Filed: Sep. 29, 2015

(65) Prior Publication Data

US 2017/0093567 A1 Mar. 30, 2017

(51) Int. Cl.
| | |
|---|---|
| H04L 9/08 | (2006.01) |
| H04L 9/32 | (2006.01) |
| G06F 21/00 | (2013.01) |
| H04L 9/06 | (2006.01) |
| G06F 21/60 | (2013.01) |

(52) U.S. Cl.
CPC ........... *H04L 9/0861* (2013.01); *G06F 21/00* (2013.01); *G06F 21/602* (2013.01); *H04L 9/0643* (2013.01); *H04L 9/3236* (2013.01); *H04L 9/3239* (2013.01); *H04L 9/3242* (2013.01); *H04L 2209/12* (2013.01)

(58) Field of Classification Search
CPC ... H04L 9/3236; H04L 9/3242; H04L 9/3239; H04L 9/0861; H04L 9/0863; H04L 9/0866; H04L 9/0643; H04L 2209/12; G06F 21/00; G06F 21/602
See application file for complete search history.

(56) References Cited

U.S. PATENT DOCUMENTS

| | | | |
|---|---|---|---|
| 7,136,838 B1 * | 11/2006 | Peinado ................. | G06F 21/10 380/281 |
| 2004/0086114 A1 * | 5/2004 | Rarick .................. | H04L 9/0625 380/29 |
| 2008/0205651 A1 | 8/2008 | Goto et al. | |

(Continued)

FOREIGN PATENT DOCUMENTS

JP 2013545182 12/2013

OTHER PUBLICATIONS

International Search Report and Written Opinion for Application No. PCT/US2016/049198, dated Nov. 29, 2016, 12 pages.

*Primary Examiner* — Ayoub Alata
(74) *Attorney, Agent, or Firm* — Nicholson De Vos Webster & Elliott LLP (57) ABSTRACT

Embodiments of an invention for hardware enforced one-way cryptography are disclosed. In one embodiment, a processor includes a processor key location, instruction hardware, and execution hardware. The processor key location is to hold a processor key. The instruction hardware is to receive a first instruction in an instruction set of the processor. The first instruction is to encrypt input data with the processor key and return a handle. The instruction set lacks a second instruction corresponding to the first instruction to decrypt the handle with the processor key to return the input data. The execution hardware is to perform, in response to receipt of the first instruction by the instruction hardware, encryption of the input data with the processor key and to return the handle.

20 Claims, 5 Drawing Sheets

(56) References Cited

U.S. PATENT DOCUMENTS

| | | |
|---|---|---|
| 2010/0254537 A1* | 10/2010 | Buer .................... G06F 21/602 |
| | | 380/279 |
| 2010/0332843 A1 | 12/2010 | Boivie |
| 2012/0216051 A1 | 8/2012 | Boivie et al. |
| 2012/0284532 A1* | 11/2012 | Wang ................... H04L 9/0637 |
| | | 713/190 |
| 2015/0019876 A1 | 1/2015 | Boivie |

\* cited by examiner

MOV_ENCRYPT instruction format 400

FIGURE 5
METHOD 500

HARDWARE ENFORCED ONE-WAY CRYPTOGRAPHY

BACKGROUND

1. Field

The present disclosure pertains to the field of information processing, and more particularly, to the field of security in information processing systems.

2. Description of Related Art

Private information and other secrets are used by and stored in many information processing systems. Many techniques have been developed to attempt to store and/or transfer secrets such that they cannot be discovered or altered. These techniques often involve the use of one or more cryptographic keys. Therefore, techniques to protect the integrity of these cryptographic keys have been developed, and more are needed as malicious attacks on information processing systems become an increasingly serious threat.

BRIEF DESCRIPTION OF THE FIGURES

The present invention is illustrated by way of example and not limitation in the accompanying figures.

DETAILED DESCRIPTION

Embodiments of an invention for hardware enforced one-way cryptography are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, many techniques for using, transferring, and storing private or confidential information involve cryptographic keys. Therefore, the use of embodiments of the present invention may be desired to provide protection for cryptographic keys and mitigate the vulnerability to attack of information processing systems and devices. For example, embodiments of the present invention may be used to generate, within a processor, any number of cryptographic keys, each of which may be used on the processor by software having access to a corresponding processor-specific "handle" for the key, where each cryptographic key is held and protected within the processor such that no firmware or software, even software that has the handle, can read or otherwise discover the key. Furthermore, even if an attacker is able to use the key on the processor (e.g., by discovering the handle), the attacker cannot use the key on or copy/move the key to a different processor or system, and the attacker's use of the key may be limited to the time until the processor or system is reset. Many other uses of embodiments of the present invention are also possible.

Figure 1:
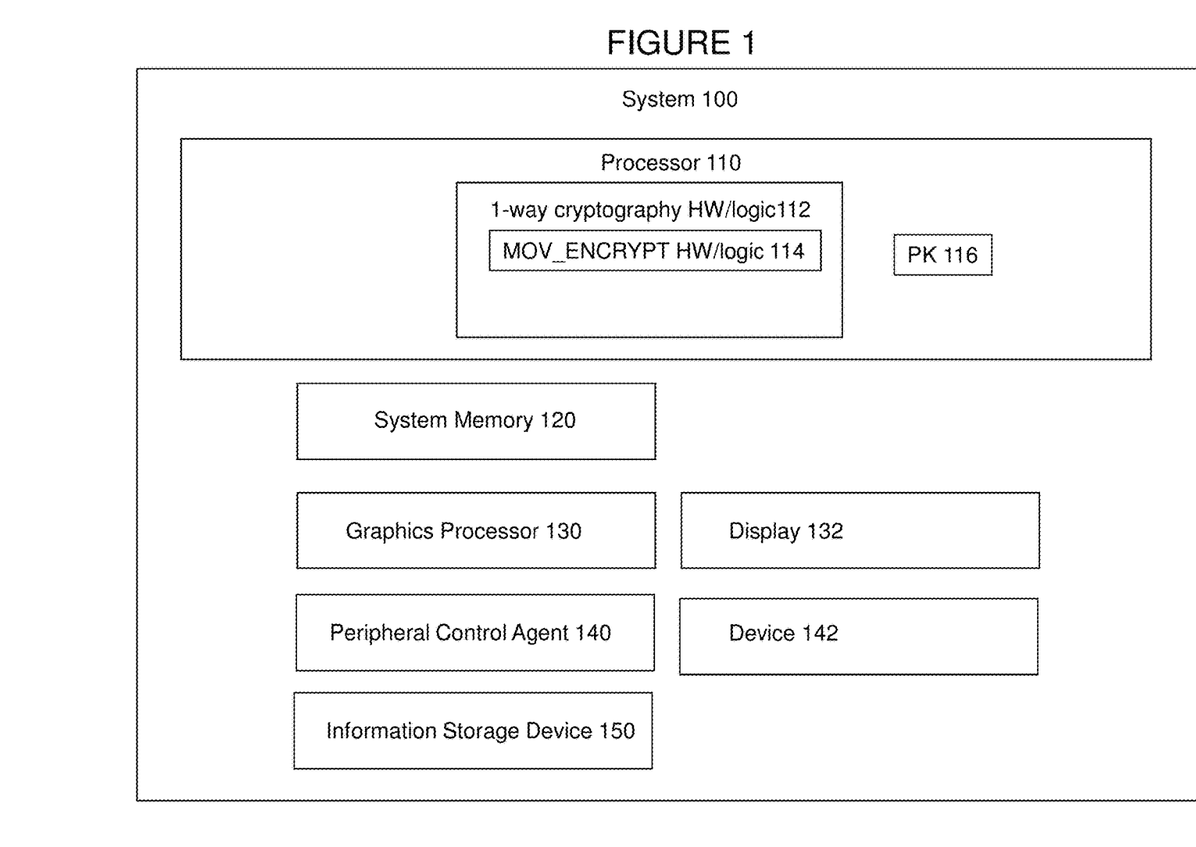
FIG. 1 illustrates a system for hardware enforced one-way cryptography including support for hardware enforced one-way cryptography according to an embodiment of the present invention.

FIG. 1 illustrates system 100, an information processing system including an embodiment of the present invention for hardware enforced one-way cryptography. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory (DRAM) or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 110 may be architected and designed to operate according to any instruction set architecture (ISA), with or without being controlled by microcode.

Support for one-way encryption according to an embodiment of the present invention may be implemented in a processor, such as processor 110, using any combination of circuitry and/or logic embedded in hardware, microcode, firmware, and/or other structures arranged as described below or according to any other approach, and is represented in FIG. 1 as one-way cryptography hardware/logic 112, which may include MOV_ENCRYPT hardware/logic 114 to support a MOV_ENCRYPT instruction as described below. Processor 110 may also include processor key (PK) 116, as described below.

Figure 2:
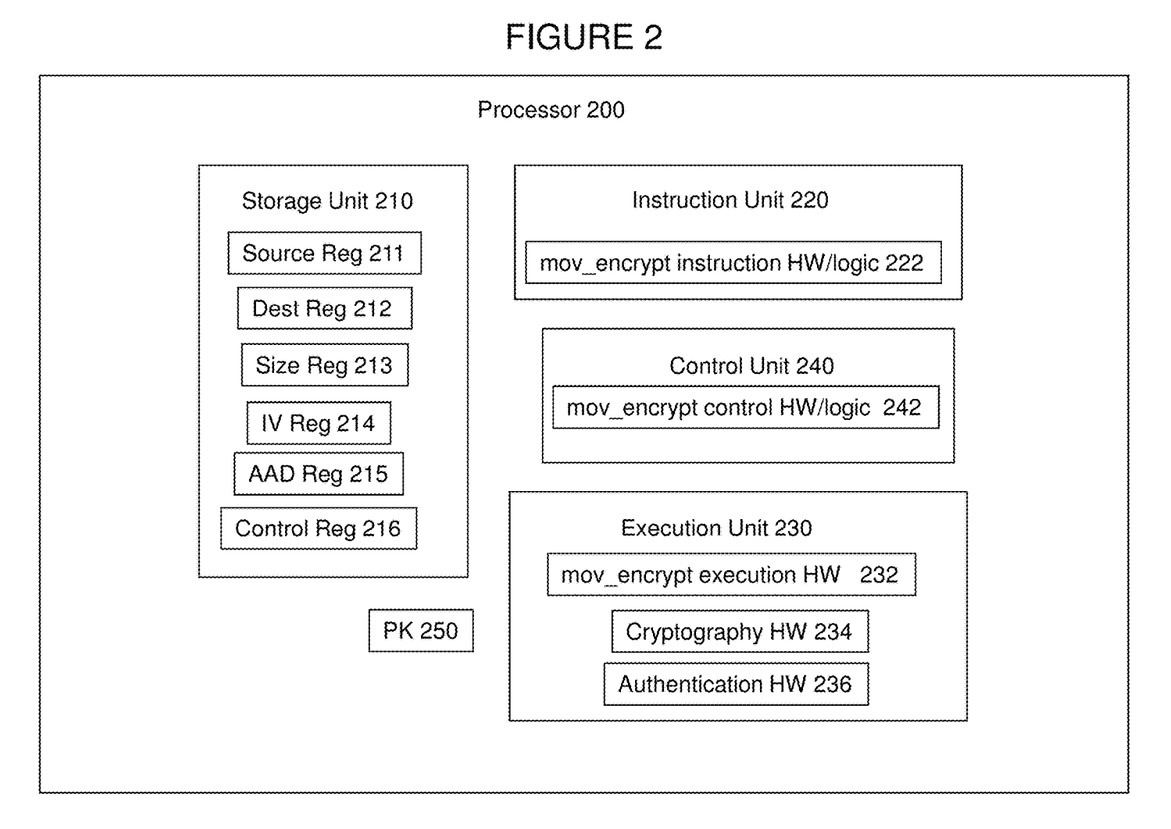
FIG. 2 illustrates a processor including support for hardware enforced one-way cryptography according to an embodiment of the present invention.

FIG. 2 illustrates processor 200, which may represent an embodiment of processor 110 in FIG. 1 or an execution core of a multicore processor embodiment of processor 110 in FIG. 1. Processor 200 may include storage unit 210, instruction unit 220, execution unit 230, control unit 240, and PK 250, where the circuitry, structure, and functionality of one-way cryptography hardware/logic 112 of FIG. 1 may be distributed among each unit of processor 200 as described below. Processor 200 may also include any other circuitry, structures, or logic not shown in FIG. 1.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage and/or to cause or support various operations and/or configurations associated with access to such storage.

Storage unit 210 may include one or more storage locations, each of any size, to be used according to embodiments of the present invention. Each of these storage locations may be any of (i.e., they need not be the same type of register) a general purpose register, a special purpose registers, an integer register, a floating-point register, a scalar register, a vector register, an XMM register (according to the architecture of a processor family from Intel® Corporation), or any other type of register or storage location of any size, but for convenience, each may be referred to as a register, and each may be referred to by a specific name that is not meant to imply that a specific register is to be used or that the register is dedicated to a special purpose.

Storage location 210 may include source register 211 (which may represent a set of registers) to hold a cryptographic key, a value to be used as a cryptographic key, a value from which a cryptographic key may be derived, a portion of such a key, any other data desired to be protected using encryption according to an embodiment of the present invention, or a pointer to or address or other direct or indirect location identifier of any such key, value, or data. For convenience, the data held, to be loaded into written to, and/or pointed to by source register 211 may be referred to as an input key (where the term "input key" is used throughout this description as a convenient way to refer to such data based on one embodiment but may mean any data desired to be protected using encryption according to any embodiment of the present invention, not limited in any way to a key or a value related to a key.) Source register 211 or the location to which it points may be writable by software being executed by processor 200, but need not be readable by software being executed by processor 200. Although source register 211 or the location to which it points may be readable by software, its content or the content to which it points may be protected by one or more known security techniques (e.g., by loading an input key into it, performing an encryption operation on the input key according to an embodiment of the present invention, then clearing it, all by or within a secure boot process, an authenticated code module, a secure or trusted processing environment, etc.).

Storage location 210 may include destination register 212 (which may represent a set of registers) to hold a result of an encryption operation according to an embodiment of the present invention or a pointer to or address or other direct or indirect location identifier of such result. For convenience, the data held, to be read or retrieved from, and/or to be pointed to by destination register 212 may be referred to as a handle, where each such handle corresponds to a particular input key from which it was derived or is derivable by a particular processor. Therefore, each such handle is unique to an input key (to the extent provided for by the cryptographic algorithm and length and value of the input key) and unique to a processor (to the extent provided for by the uniqueness of the processor key, which in various embodiments may be shared by two or more processors). Destination register 212 or the location to which it points may be readable by software being executed by processor 200, but need not be writable by software being executed by processor 200. Although destination register 212 or the location to which it points may be readable by software, its content or the content to which it points may be protected by one or more known security techniques (e.g., by loading an input key, performing an encryption operation on the input key according to an embodiment of the present invention, reading destination register 212 or the location to which it points, then clearing it, all by or within a secure boot process, an authenticated code module, a secure or trusted processing environment, etc.).

Storage location 210 may include size register 213 to hold the size of the input key. For example, in an embodiment in which source register 211 holds a pointer to a data buffer in system memory 120, size register 213 may be used to hold the number of blocks to be encrypted (e.g., the number of blocks in the data buffer), where each block may be any number of bits (e.g., 128 bits or any other number of bits specified by the encryption algorithm).

Storage location 210 may include initialization vector (IV) register 214 (which may represent a set of registers) to hold an IV or a pointer to or address or other direct or indirect location identifier of an IV, where an IV may be an IV (e.g., for Advanced Encryption Standard (AES) cipher-block-chaining (CBC) mode), an initial counter value (e.g., for Advanced Encryption Standard (AES) Galois-counter-mode (GCM)), seed, random number, other value (e.g., as defined by or to be used in or according to any cryptography operation, cipher, or standard), or any data from which such a value may be derived. IV register 214 or the location to which it points may be writable by software being executed by processor 200, but need not be readable by software being executed by processor 200. In an embodiment, IV register 214 or the location to which it points may be neither readable nor writable by software, but may be written to or loaded into by hardware (e.g., a hardware random number generator) or firmware. In an embodiment in which IV register 214 or the location to which it points is readable by software, its content or the content to which it points may be protected by one or more known security techniques (e.g., by loading an IV into IV register 214 or the location to which it points, performing an encryption operation using the IV according to an embodiment of the present invention, then clearing IV register 214 or the location to which it points, all by or within a secure boot process, an authenticated code module, a secure or trusted processing environment, etc.).

Storage unit 210 may include additional authentication data (AAD) register 215 to hold additional data to provide for authentication in addition to encryption as a protection mechanism. For example, in an embodiment of the present invention, the handle is to include an authentication tag or other meta-data that may be used for the processor to verify that the handle was properly generated using the processor's PK.

Storage unit 210 may include control register 216, which may represent one or more control registers specified or defined according to an existing processor or instruction set architecture, one or more new control registers added to an existing processor or instruction set architecture, or one or more bits/fields in an existing or new register. In various embodiments, control register 216 may include one or more bits to enable one or more features of the present invention. For example, control register 216 may include one or more programmable bits to select a particular encryption cipher or mode in embodiments of the present invention in which more than encryption cipher or mode may be used.

Instruction unit 220 may include any circuitry, logic, structures, and/or other hardware, such as an instruction decoder, to fetch, receive, decode, interpret, schedule, and/or handle instructions to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach.

In an embodiment, instruction unit 220 may include mov-encrypt instruction hardware/logic 222 (which may include any combination of the hardware/logic listed above) to receive (and/or otherwise handle in any way listed above) a MOV_ENCRYPT instruction. Embodiments of the present invention described below illustrate one or more possible formats of a MOV_ENCRYPT instruction and/or one or more possible responses of a processor to a MOV_EN-CRYPT instruction. Note that the name of this instruction is provided merely for convenience, and embodiments of the present invention may include such an instruction having any name desired. In various embodiments, one or more variants of a MOV_ENCRYPT instruction may be added to an existing ISA as enhancements, extensions, leaves, or other variants of an existing instruction (e.g., a string-copy instruction).

Note also that various embodiments of the present invention are described and more may be possible, including various differences in the operands/parameters of a MOV_ENCRYPT instruction and the response of a processor to a MOV_ENCRYPT instruction. In various embodiments, different instructions and/or opcodes may be used for each different variety of a MOV_ENCRYPT instruction, or they may be leaves or variants of the same instruction/opcode. Note also that the processor's execution of and/or response to a MOV_ENCRYPT instruction may also or instead be performed (and/or possibly referred to below as a MOV_ENCRYPT operation) in response to or in connection with other events (e.g., a write to or setting (by software, firmware, or hardware) of bits of a command, model-specific, or other register; a VM entry or exit; etc.). Embodiments of the present invention may include any one or more of these variations.

Instruction unit 220 may support an ISA (e.g., be capable of correctly receiving, handling, and/or sending for execution only the instructions that are in the ISA) that includes a MOV_ENCRYPT instruction but no corresponding decryption instruction. In other words, the ISA allows software to encrypt cryptographic keys and/or other information according to an embodiment of the present invention, but does not allow the software or any other software to decrypt the encrypted result. In an embodiment, the processor may support such an ISA (i.e., an ISA that include a MOV_EN-CRYPT instructions but no corresponding decrypt instruction) in a first mode of operation (e.g., a normal mode) but support an ISA that includes a corresponding decryption instruction in a second mode of operation (e.g., a secure mode).

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units. Execution unit 230 may include mov-encrypt execution hardware 232 to execute a MOV_ENCRYPT as further described below. Although shown as a separate element in FIG. 2, mov-encrypt execution hardware may include circuitry that is also used to execute other instructions and/or perform other operations.

Execution unit 230 may include cryptography hardware 234 to implement any one or more cryptographic algorithms, such as an Advanced Encryption Standard (AES) algorithm in electronic-code-book (ECB), Galois-counter-mode (GCM), and/or cipher-block-chaining (CBC) mode. Alternatively, encryption may be performed by other hardware (e.g., shared, general-purpose hardware) in execution unit 230. The input to any such encryption hardware/ algorithm may be referred to as plain-text and the output as cipher-text.

PK 250 (as described below) may be within, hardwired, or otherwise connected to cryptography hardware 234 and/or execution unit 230 such that PK 250 may be used as a cryptographic key in any one or more encryption algorithms performed by cryptographic hardware 234 and/or execution unit 230, without exposing the PK 250 to software or discovery. In many embodiments, only the encryption hardware within processor 200 has access to PK 250.

Execution unit 230 may include authentication hardware 236 to implement any one or more hashing algorithms (e.g., a Secure Hash Algorithm (SHA), a Galois hash (GHASH) algorithm, etc.), generate a message authentication code (MAC), authentication tag, or other data that may be used to authenticate or verify the integrity of the handle (e.g., that it was properly generated using the processor's PK), and/or perform any other authentication function to provide for authentication in addition to encryption as a protection mechanism. Alternatively, hashing and/or generation of a MAC and/or authentication tag and/or any other authentication function may be performed by other hardware (e.g., shared, general-purpose hardware) in execution unit 230.

In an embodiment of the present invention, cryptography hardware 234 and authentication hardware 236 may be used and/or integrated together (and/or with shared, general-purpose hardware) to implement an authenticated encryption algorithm (e.g., AES-GCM). For example, FIG. 3 illustrates the operation of authenticated encryption hardware to perform authenticated encryption in connection with the execution of a MOV_ENCRYPT instruction operating on three blocks of data (e.g., in an embodiment in which the MOV_ENCRYPT instruction is used to implement AES-GCM), where $Y_0$ represents an initial counter value, Auth Data represents AAD, Auth Tag represents an authentication tag, P represents plain-text, and C represents cipher-text (each as introduced above or below and as may be provided and/or used as further described below).

Figure 3:
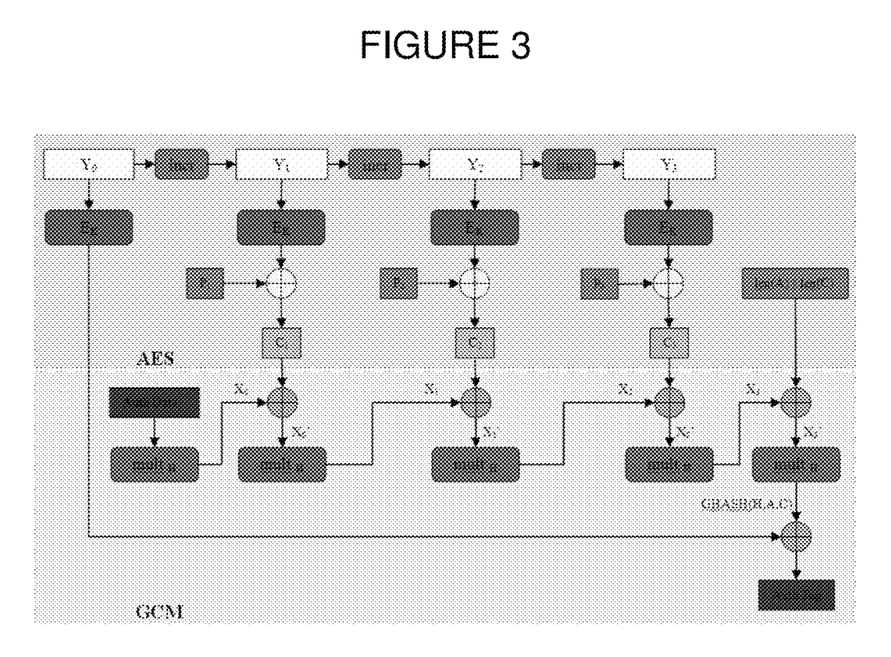
FIG. 3 illustrates the operation of authenticated encryption hardware to perform authenticated encryption in connection with the execution of a MOV_ENCRYPT instruction according to an embodiment of the present invention.

In FIG. 3, the top portion shows the computations associated with the AES encryption and the bottom portion shows the GHASH computations. The inputs to the operation consist of the key (PK 250), the plain-text, the initialization data, the AAD, and the size (may also be referred to as length). The outputs are the cipher-text and the authentication tag.

The initialization data includes a salt and a sequence number, concatenated with an initial counter value of 1, to form the value $Y_0$. Subsequent values $Y_i$ are generated by incrementing the counter, shown by the "incr" block. The cipher-text blocks are generated by performing $C_i=E_K(Y_i) \oplus P_i$. The initial counter value is encrypted to use as a mask on the final tag.

The AAD is a single padded block. A first GHASH operation using the AAD to compute the initial digest $X_0$ is performed. The GHASH operation is denoted by the "mult H" block. The subsequent GHASH operations are performed on the three cipher-text blocks generated by the AES counter mode encryption process. A final GHASH operation is performed on a block generated with the length data, XOR'd with an encrypted mask to produce the final digest. The authentication tag is the final digest or a subset of the bytes.

Returning to FIG. 2, control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information stored in storage unit 210, where such control and/or configuration information may be stored in or programmed into control/configuration registers such as control register 216.

In an embodiment, control unit 240 may include mov-encrypt control hardware/logic 242, which may represent microcode, firmware, circuitry, logic, structures, and/or hardware to control the execution of a MOV_ENCRYPT instruction/operation.

In embodiments of the present invention, PK 250 may represent any root key, key encryption key, processor or platform unique key, or other key, and may be embedded (e.g., with metal tie-ups or tie-downs or any other register transfer language technique) during fabrication, programmed into a fuse array, generated from a physically unclonable function (PUF) array or a random number generator, or otherwise included in or derivable by processor 200. In an embodiment, PK 250 (e.g., the memory or array in which it is stored) is inaccessible to software or firmware running on processor 200 or any other processor or other agent in system 100, in other words, PK 250 is protected from being read by software or firmware. PK 250 and/or the encryption hardware that uses it may be shared by one or more execution cores within processor 200.

In various embodiments of the present invention, a new and/or different value of PK 250 may be generated by processor 250 at various times, such that a successful attack (e.g., one that has gained access to a handle or another way of decrypting or discovering a cryptographic key or other information encrypted with PK 250) may be prevented from continued success after such times. For example, in an embodiment in which PK 250 is derived from a random number generator, a new value of PK 250 may be generated each time processor 200 is reset (and then software using an embodiment of the present invention may re-encrypt its cryptographic key or other information and generate a new handle).

In embodiments of the present invention, a value for PK 250 may be provided by software. For example, an authenticated code module running in a trusted execution environment during a secure boot process may derive (e.g., from a random number generator) or unseal (e.g., from a trusted platform module) a value for PK 250 and store it in a designated storage location in processor 200. The designated storage location may be protected according to any approach, including those already described in this specification. For example, it may be a write only register or a register accessible only by a cryptographic security engine, other privileged hardware agent or entity, or firmware or software within a secure or trusted processing environment. In other embodiments of the present invention, any combination of hardware, firmware, and software (e.g., encryption of a software-specified random number using a key derived from hardware fuses, a hardware key that may be selectively overwritten (e.g., for virtualization) or otherwise overridden by a software supplied key, etc.) may be used to generate a value for PK 250.

Figure 4:
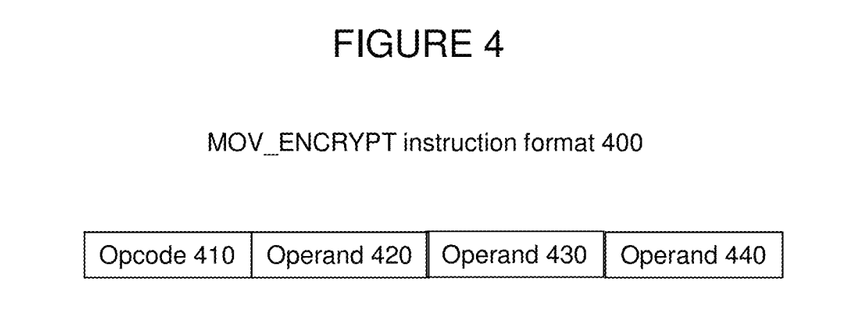
FIG. 4 illustrates a format of a MOV_ENCRYPT instruction according to an embodiment of the present invention.

FIG. 4 illustrates a format 400 of a MOV_ENCRYPT instruction according to an embodiment of the present invention. Format 400 may include any number of fields, each field including any number of bits. The total number of bits in format 400 may depend on the instruction set architecture of the processor. For example, format 400 may have a length of 32 bits, 64 bits, etc. In various embodiments of the present invention, a format of a MOV_ENCRYPT instruction may include any combination of the fields shown in FIG. 4, and/or any number of other operand fields, immediate fields, reserved fields, or any other fields.

Format 400 includes a first field 410, which may be an operation encoding (opcode) field to specify the type of instruction. In embodiments, one or more particular values may be used as an opcode for a MOV_ENCRYPT instruction. The opcode may be one that results in the execution of no operation (NOP) according to one or more instruction set architectures with which a new or extended instruction set architecture is designed to be backward-compatible.

Format 400 may include a second field 420, which may be an operand field to specify a size register (as described above). In an alternative embodiment, a size may be specified as an immediate in the instruction format or through a different instruction opcode.

A definition of a MOV_ENCRYPT instruction using first field 410 for an opcode to specify a "mov-encrypt" instruction and second field 420 for an explicit operand ("reg") to specify a size (e.g., the size, in blocks, of an input buffer to be encrypted with a block based ciper such as AES-ECB) is shown below. In this (and subsequent) example(s), "rsi" and "rdi" represent implicit operands, a source register and a destination register, respectively, as described above, where the source register holds a pointer to the input buffer to be encrypted and the destination register holds a pointer to an output buffer in which to store the handle. Execution of this embodiment of a MOV_ENCRYPT instruction causes execution unit 230 to incrementally perform a block-by-block encryption operation ("block-cipher-encrypt") with PK 250 as the encryption key and the content of the input buffer as the plain-text, where the cipher-text (the handle) is written to the output buffer.

```
Mov-encrypt reg{
// reg holds size in "number of blocks",
//   could also be specified as an immediate byte
// implicit registers rsi and rdi hold source and destination pointers
     For (i=0; i< reg; i++){
     rdi[i] = block-cipher-encrypt(PK, rsi[i])
     }
}
```

Format 400 may include a third field 430, which may be an operand field to specify an IV register (as described above) for an encryption mode using such an IV or other such value (e.g., AES-CBC). In alternative embodiment, an IV or other such value may be provided by hardware (e.g., a random number generator in the processor), instead of by software using third field 430 for this purpose.

A definition of a MOV_ENCRYPT instruction using first field 410 for an opcode to specify a "mov-encrypt-CBC" instruction, second field 420 for an explicit operand ("reg") to specify a size, and third field 430 for an explicit operand ("reg2") to specify an IV is shown below. Execution of this embodiment of a MOV_ENCRYPT instruction causes execution unit 230 to incrementally perform a block-by-block AES-CBC encryption operation ("block-cipher-cbc-encrypt") with PK 250 as the encryption key, the content of the input buffer as the plain-text, and IV as an additional input, where the cipher-text (the handle) is written to the output buffer.

```
Mov-encrypt-CBC reg, reg2{
// reg holds size in "number of blocks",
//   could also be specified as an immediate byte
// implicit registers rsi and rdi hold source and destination pointers
// reg2 holds IV (note, could be an XMM register if using 128-bit cipher)
     rdi[0] = block-cipher-cbc-encrypt(PK, reg2, rsi[0])
     For (i=1; i< reg; i++){
     rdi[i] = block-cipher-cbc-encrypt(PK, rdi[i-1],rsi[i])
     }
}
```

In format 400, third field 430 may instead be an operand field to specify an AAD register (as described above) for an authenticated encryption operation. A definition of a MOV_ENCRYPT instruction using first field 410 for an opcode to specify a "mov-encrypt-auth" instruction, second field 420 for an explicit operand ("reg") to specify a size, and third field 430 for an explicit operand ("reg3") to specify AAD is shown below. Execution of this embodiment of a MOV_ENCRYPT instruction causes execution unit 230 to incrementally perform a block-by-block encryption operation ("block-cipher-encrypt") with PK 250 as the encryption key and the content of the input buffer as the plain-text, where the cipher-text is written to the output buffer, and then to perform an authentication function ("authentication-function") on the AAD and the cipher-text to generate an authentication tag ("Tag"), and then write the size (or length), AAD, and the tag to the output buffer, such that the handle includes the cipher-text and information needed to perform authentication of the handle. In an alternative embodiment, generation of the tag may be based on the plain-text instead of the cipher-text.

```
Mov-encrypt-auth reg, reg3{
// reg holds size in "number of blocks",
//   could also be specified as an immediate byte
// implicit registers rsi and rdi hold source and destination pointers
// reg3 holds additional data to be authenticated "AAD"
     For (i=0; i< reg; i++){
     rdi[i] = block-cipher-encrypt(PK, rsi[i])
     }
     Tag = authentication-function(reg3, rdi, reg)
     // can also be based on plaintext
     rdi[i++] = reg // store the length
     rdi[i++] = reg3 // store the AAD
     rdi[i++] = Tag // store the Tag
}
```

Format 300 may include a fourth field 440 to provide for three explicit operands. A definition of a MOV_ENCRYPT instruction using first field 410 for an opcode to specify a "mov-encrypt-auth-AES-GCM" instruction, second field 420 for an explicit operand ("reg") to specify a size, third field 430 for an explicit operand ("reg2") to specify an initial counter value ($Y_0$), and fourth field 440 for an explicit operand ("reg3") the specify AAD is shown below. Execution of this embodiment of a MOV_ENCRYPT instruction causes execution unit 230 to incrementally perform a block-by-block AES-GCM encryption operation ("aes-gcm-encrypt") with PK 250 as the encryption key, the content of the input buffer as the plain-text, and $Y_0$ and AAD as additional inputs, where the cipher-text, size (or length), AAD, and tag are written to the output buffer, such that the handle includes the cipher-text and information needed to perform authentication of the handle. An example of this AES-GCM operation on three blocks of data is illustrated in FIG. 3.

```
Mov-encrypt-auth-AES-GCM reg, reg2, reg3{
// reg holds size in "number of blocks",
//   could also be specified as an immediate byte
// implicit registers rsi and rdi hold source and destination pointers
// reg2 holds Y0 the initial counter (note, an XMM register)
// reg3 holds additional data to be authenticated "AAD"
        rdi = aes-gcm-encrypt(PK, reg, reg2, reg3, rsi)
        rdi[i++] = reg  // store the length
        rdi[i++] = reg2 // store the Y0 counter
        rdi[i++] = reg3 // store the AAD
        rdi[i++] = Tag  // store the Tag
}
```

Note that in each of the above instruction definition examples, all of the operations associated with that example are performed by the processor in response to a single instruction. For example, the processor performs both encryption and authentication in response to a mov-encrypt-auth instruction, so that the code may include a single instruction rather than two or more instructions to accomplish the specified operations.

Figure 5:
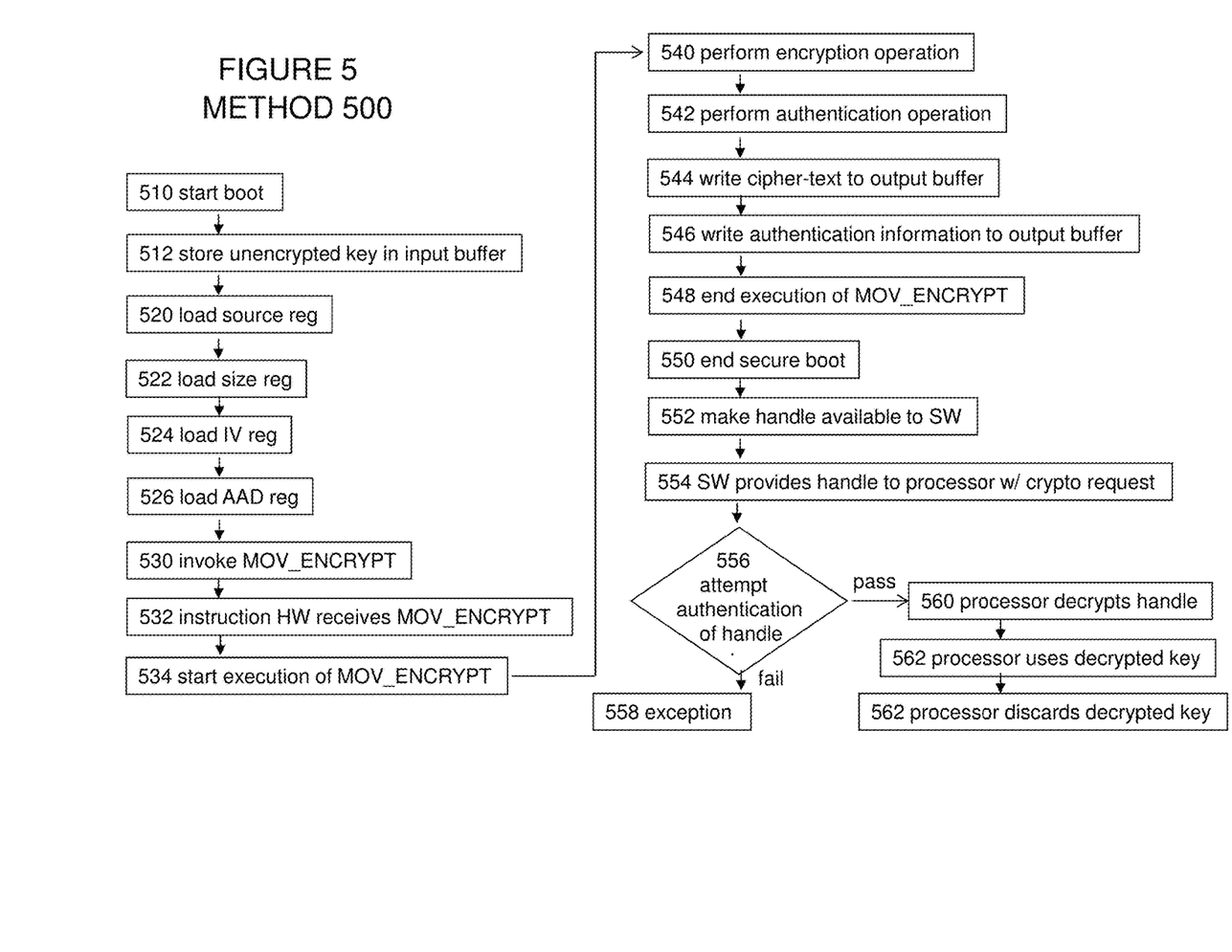
FIG. 5 illustrates a method for hardware enforced one-way cryptography according to an embodiment of the present invention.

FIG. 5 illustrates method 500 for hardware enforced one-way cryptography according to an embodiment of the present invention. Although method embodiments of the invention are not limited in this respect, reference may be made to elements of FIGS. 1, 2, and 3 to help describe the method embodiment of FIG. 5. Various portions of method 500 may be performed by hardware, firmware, software, and/or a user of a system or device.

In box 510 of method 500, booting (e.g., a secure or trusted boot process including the execution of instructions in trusted code to perform boxes 512 to 548 of method 500) of an information processing system (e.g., system 100) including a processor according to an embodiment of the present invention (e.g., processor 110/200) begins.

In box 512, an unencrypted key is stored in a data buffer (the "input buffer") in system memory (e.g. system memory 120). Various embodiments of the present invention may store information other than an unencrypted key in the input buffer, but for convenience, this description may refer to that information as an unencrypted key.

In box 520, a pointer to the input buffer is written to a processor register (the source register). In box 522, the size of the input buffer may be written to a processor register (the size register). In box 524, an initialization value (e.g., an IV, an initial counter value, etc.) may be written to a processor register (the IV register). In box 526, AAD may be written to a processor register (the AAD register).

In box 530, an ENCRYPT_MOV instruction, having an opcode to specify an encryption operation (e.g., to specify the algorithm, the mode, the use/type of authentication, etc.), is invoked. The instruction may also have a first operand to specify the size register, a second operand to specify the IV register, and/or a third operand to specify the AAD register.

In box 532, the MOV_ENCRYPT instruction is received by instruction hardware (e.g., instruction unit 220) in the processor. In box 534, in response to the instruction hardware receiving the instruction, execution of the MOV_ENCRYPT instruction begins.

In box 540, execution hardware in the processor (e.g., execution unit 230, cryptography hardware 234, and/or authentication hardware 236) performs an encryption operation, using a processor key (e.g., PK 250), on the content of the input buffer. In various embodiments, the processor may be hardwired to perform a particular encryption operation and/or mode, and/or the processor may be instructed, programmed, or configured to select an encryption operation, mode, use/type of authentication, etc., based on one or more of an opcode, one or more operands, content of a control/configuration register (e.g. control register 216), etc. In various embodiments, additional inputs to the encryption operation may include an initialization value (e.g., an IV, an initial counter value, etc.), AAD, etc.

In box 542, an authentication operation may also be performed to generate an authentication tag. In embodiments, the authentication operation may be performed as part of, in parallel with, or otherwise in connection with the encryption operation.

In box 544, performance of the encryption operation results in writing cipher-text to an output buffer or other handle storage location. In box 546, performance of the encryption operation may also result in writing authentication information, such as the size, the initial counter value, the AAD, and the authentication tag, to the output buffer or other handle storage location. In box 548, execution of the MOV_ENCRYPT instruction ends.

Note that the processor does not need to store the unencrypted key or the handle because it can use execution unit 230 and PK 250 to regenerate the key at any time that software provides the handle. Also note that boxes 512 to 548 may be repeated (e.g., with a different unencrypted key and other parameters) as often as desired and/or performed outside of a secure boot process in order to generate as many handles as desired, at any time and for any purpose desired.

In box 550, the secure boot process ends.

In box 552, the handle may be made available for use by software. For example, an operating system (OS) or other system-level or privileged software may have access to the output buffer or other handle storage location, for its own use, for its own use on behalf of application or user-level software, or to provide to application or user-level software.

In box 554, the handle may be provided to the processor (e.g., by the software referred to in box 552) in connection with an instruction or other request to encrypt or decrypt information. The request to encrypt or decrypt information may be in connection with any of a variety of purposes (e.g., disk encryption/decryption, establishing or engaging in secure communications with other systems, etc.)

In box 556, the processor may attempt to authenticate the handle using authentication information included in the handle. If authentication fails, then in box 558, an exception may be generated, the processor may return an error code, or the authentication failure may be indicated according to any other approach. Authentication may fail if the handle was not properly generated using the processor's PK (e.g., PK 250). Authentication may fail if the attempted use of the handle (e.g., as a key for an SM4 cipher) does not match the intended use of the handle (e.g., as indicated by the AAD, such as for use as a key for AES 128).

If authentication passes, then method 500 continues in box 560.

In box 560, the processor may decrypt the handle using its processor key (e.g., PK 250) to generate a decrypted key. Note that box 560 may be performed as part of the performance of box 556.

In box 562, the processor may use the decrypted key to encrypt or decrypt the information as requested in box 554. The box 564, the processor discards the decrypted key (e.g., clears any registers in which it was stored).

In various embodiments of the present invention, the method illustrated in FIG. 5 may be performed in a different order, with illustrated boxes combined or omitted, with additional boxes added, or with a combination of reordered, combined, omitted, or additional boxes. Furthermore, method embodiments of the present invention are not limited to method 500 or variations thereof. Many other method embodiments (as well as apparatus, system, and other embodiments) not described herein are possible within the scope of the present invention. For example, the input buffer and/or the output buffer may be in a memory or storage location other than system memory 120 (e.g., a cache in or accessible by the processor, and/or a memory or region of memory protected by any known technique.

Embodiments or portions of embodiments of the present invention, as described above, may be stored on any form of a machine-readable medium. For example, all or part of method 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for hardware enforced one-way cryptography have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a processor key location to hold a processor key;
   an instruction decoder to decode instructions of an instruction set architecture of the processor, the instruction set architecture including a first instruction having a format including a first field and a second field, the first field for an opcode to specify an encryption to be performed by the processor to encrypt input data with the processor key and return a handle, the instruction set architecture lacking a second instruction corresponding to the first instruction to decrypt the handle with the processor key to return the input data, the second field to specify a size of the input data; and
   execution hardware to perform, in response to decode of the first instruction by the instruction decoder, encryption of the input data with the processor key and to return the handle.

2. The processor of claim 1, wherein the execution hardware includes cryptography hardware to perform the encryption.

3. The processor of claim 1, wherein the execution hardware is also to perform, in response to the instruction decoder decoding the first instruction, an authentication operation.

4. The processor of claim 2, wherein the execution hardware also includes authentication hardware to perform an authentication operation in connection with the encryption to generate an authentication tag.

5. The processor of claim 4, wherein the execution hardware is also to include the authentication tag in the handle.

6. The processor of claim 1, further comprising a source storage location to specify a location of an input buffer to hold the input data.

7. The processor of claim 1, further comprising a destination storage location to specify a location of an output buffer to hold the handle.

8. The processor of claim 6, further comprising a size storage location to specify a size of the input buffer.

9. The processor of claim 1, further comprising a data storage location to specify an initialization value to be used as an input to the encryption.

10. The processor of claim 3, further comprising a data storage location to specify data to be used as an input to the authentication operation.

11. The processor of claim 1, wherein the instruction set architecture is also lacking a third instruction to read the processor key location.

12. A method comprising:
    receiving, by an instruction decoder in a processor, a first instruction in an instruction set architecture of the processor, the first instruction having a format including a first field and a second field, the first field for an opcode to specify an encryption to be performed by the processor to encrypt a cryptography key with a processor key and return a handle, the instruction set architecture lacking a second instruction corresponding to the first instruction to decrypt the handle with the processor key to return the cryptography key, the second field to specify a size of the input data;
    encrypting, by execution hardware in the processor in response to decode of the first instruction by the instruction decoder, the cryptography key with the processor key; and
    returning, by the processor, the handle.

13. The method of claim 12, further comprising generating, by the execution hardware in the processor in response to decode of the first instruction by the instruction decoder, an authentication tag by performing an authentication operation.

14. The method of claim 13, returning the handle includes returning the authentication tag in the handle.

15. The method of claim 14, wherein after the processor returns the handle, software provides the handle to the processor in connection with a request for a cryptography operation.

16. The method of claim 15, wherein:
    after software provides the handle to the processor, the processor attempts to authenticate the handle using the authentication tag; and
    if authentication of the handle succeeds, the processor decrypts the handle using the processor key to re-generate the cryptography key.

17. The method of claim 16, wherein after the software provides the handle to the processor, if authentication of the handle fails, the processor generates an exception or returns an error code.

18. The method of claim 17, wherein after the processor decrypts the handle, the processor uses the re-generated cryptography key to perform the requested cryptography operation.

19. The method of claim 18, wherein after the processor performs the requested cryptography operation, the processor discards the re-generated cryptography key.

20. A system comprising:
a system memory in which to store a cryptography key; and
a processor including:
a processor key location to hold a processor key;
an instruction decoder to decode instructions of an instruction set architecture of the processor, the instruction set architecture including a first instruction having a format including a first field and a second field, the first field for an opcode to specify an encryption to be performed by the processor to encrypt input data with the processor key and return a handle, the instruction set architecture lacking a second instruction corresponding to the first instruction to decrypt the handle with the processor key to return the input data, the second field to specify a size of the input data; and
execution hardware to perform, in response to decode of the first instruction by the instruction decoder, encryption of the input data with the processor key and to return the handle.

* * * * *